March 3, 1959 F. T. STANCHUS 2,876,329
ELECTRIC ARC WORKING
Filed Aug. 14, 1956

INVENTOR
FRANK T. STANCHUS
BY
Barnwell R. King
ATTORNEY

United States Patent Office 2,876,329
Patented Mar. 3, 1959

2,876,329

ELECTRIC ARC WORKING

Frank T. Stanchus, West Orange, N. J., assignor to Union Carbide Corporation, a corporation of New York Application August 14, 1956, Serial No. 603,926

10 Claims. (Cl. 219—74)

This invention relates to electric arc working, and more particularly to gas shielded arc welding of the type disclosed by the Muller et al. Patent No. 2,504,868, that is referred to herein as "sigma" welding.

Sigma welding, as per Mikalapov Patent No. 2,544,711, was best accomplished according to such patent with a non-turbulent or laminar flow of gas shielding the arc, and was, in general, limited to reverse polarity (electrode positive). According to Muller et al., below an arc voltage of 20 volts (with $1/16''$ aluminum wire and a welding current of 140 amperes) in argon, a crackling arc was produced; and at an arc voltage of 18 volts (with a welding current of 120 amperes) results also were entirely unsatisfactory. Refractory electrode inert gas shielded arc welding likewise was thought to be best accomplished with a laminar or non-turbulent arc shielding gas flow as per Drake Patent No. 2,468,808.

According to this invention, however, the arc shielding gas stream is deliberately made to flow at Reynolds numbers preferably above 3000 (although Reynolds numbers as low as 2000 also have been used successfully) not only without adversely affecting the arc or weld shielding but actually improving the operation. This is accomplished preferably by discharging the gas at an exit velocity of more than 10 feet per second through an annular orifice comprised of a small diameter nozzle used in conjunction with a guide tube tip of selected outside diameter and positioned so that effective shielding, gas-constriction and stabilization of the arc are established by the resultant annular high-velocity curtain of gas. Furthermore a sonic resonant condition may be established inside the gas cup and the gas passages leading thereto, superimposing an electrical oscillation upon both the arc current and arc voltage, the frequency of such oscillation being a multiple of the frequency of the ripple of the arc power supply voltage (for example, 360 cycles per second in a 3 phase full-wave constant-potential rectified 60 cycle power supply, as per Galbraith et al., Ser. No. 386,048, filed October 14, 1953) with entirely new and unexpected results. One such result is that the arc becomes unusually stable. Thus, in sigma welding unexpected arc stability and, contrary to the teaching of Mikalapov, excellent weld shielding is obtained. In addition, so called spray-like metal transfer is obtained with aluminum wires at voltages as low as $18\frac{1}{2}$ volts when using 195-amp. reverse-polarity current. Normally, spray-type transfer at such current level could not be obtained at arc voltages below 22 volts according to the prior art. Improved results are also obtained when using straight-polarity welding current according to the invention.

The arc of the present invention preferably has a novel, characteristic high-pitched tone or whistling sound (above 360 and up to 12,000 cycles per second) although there are inaudible conditions of arc stabilization and gas constriction outside of the nozzle in which unexpected benefits of the invention are obtained. Any suitable gas may be used as required by the kind and type of material involved without departing from the invention.

Many process advantages such as improved weld shielding, deeper penetration and reduction of porosity result from the invention. Advantages demonstrated by the invention provide considerable improvement in the art of inert gas shielded arc welding. This invention is particularly advantageous with the constant potential type of welding power, as well as with conventional drooping volt-ampere characteristic type of power. Arc instability, lack of weld penetration, and excessive weld porosity have been common problems in sigma welding with constant potential power, particularly on aluminum. Also, when welding with small-diameter (less than $1/16''$) aluminum wires, arcing in the guide tube tip caused the wire to fuse to the tip, thereby interrupting wire feed. In the past, many special electrical contact assemblies were tested with the hope of overcoming such problems; the results were only partially satisfactory. The present invention unexpectedly overcomes such difficulties.

From observation of the current and voltage traces and corresponding high speed movies, the whistling of the arc is actually a sonic resonant condition. The effect of such resonance is to cause the arc to contract and expand with resulting changes in arc current and arc voltage at the frequency of resonance. In any case, according to the invention, the arc is constricted and stabilized by the gas as it leaves the nozzle. The calculated exit velocity of such gas around and directly adjacent the arc is of the order at least two times more than that of the prior art for sigma welding.

Figure 1:
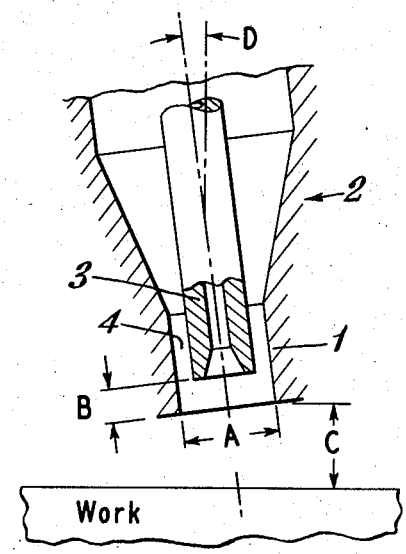
Fig. 1 is a diagram illustrating the invention.

As shown in Fig. 1, a small-diameter nozzle 1 is used on the torch 2 in conjunction with a guide tube tip 3 which is positioned in a special relationship with such nozzle. With such arrangement, a relatively small annular space 4 is provided through which the arc shielding gas flows. Short nozzle-to-work distances are preferably used. The following table, when considered with Fig. 1, shows the geometric relationships and sizes of torch nozzles and guide tube tips for the present invention compared to prior mechanized sigma welding.

*Mechanized sigma welding*

| Dimension | Invention | Prior Art |
|---|---|---|
| A | $3/8''$ I.D. | $3/4''$ I.D. |
| B | $1/8''$ | $1/4''$ |
| C | $5/16''$ | $1/2''$ |
| D | 0–10° | 15° |

The invention has, thus far, been reproduced within the following ranges of variables: Nozzles of both $3/8$-in. and $7/16$-in. diameters I. D. have been successfully used. Guide tube tips of $1/4$-in. O. D. have worked. Setbacks of from zero to $1/4$-in. have worked with small nozzles, but as expected due to loss of exit velocity setbacks of greater than $1/4$-in. resulted in loss of both arc stability and weld shielding. Short nozzle to work distances are desirable with a maximum of $1/2$-in. for best results for present arrangements. Argon flow rates in excess of 30 C. F. H. have been used. A high degree of nozzle and guide tube tip concentricity is desirable. Excellent results can be obtained with electrode angles D, Fig. 1, of from zero to 10 degrees. Previously, greater than 10 degrees was necessary to obtain good sigma weld shielding, especially on aluminum.

Figure 2:
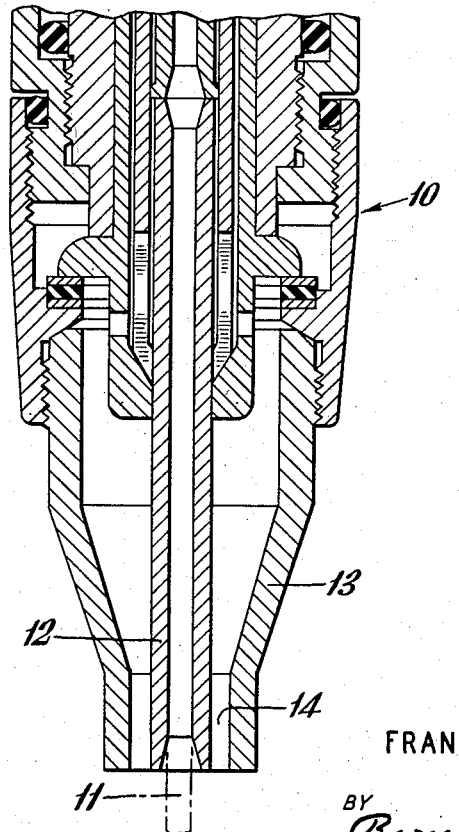
Fig. 2 is a fragmentary vertical cross-sectional view of a sigma welding torch modification.

As shown in Fig. 2, a sigma welding torch 10 is provided in which a bare metal electrode rod or wire 11 is fed through a guide tube (electrical contactor) tip 12 centered within a gas cup or nozzle 13, so as to leave an annular gas orifice 14. A welding arc is struck between the end of the wire 11 and a workpiece as gas flows at a velocity of the order of 10 or greater feet per second through the orifice 14 to shield, constrict and stabilize the arc as the wire is fed toward such arc. Current is supplied to the arc at a strength sufficient to both consume the wire and also project molten metal axially from the end of the wire electrode to the workpiece in the form of a "spray" of fine discrete droplets of molten metal within the constricting gas shield which not only excludes air from the arc but constricts and thereby substantially stabilizes the arc and improves the welding operation.

Mechanized sigma welding of aluminum with constant potential power is becoming increasingly popular. However, the results with constant potential power in the past have been somewhat disappointing, particularly on aluminum, because of arc instability. With small-diameter wires, the problem is further aggravated by arcing in the guide tube tips which causes the wire to stop feeding. Such difficulties are encountered with sigma torches when following normal prior practice.

According to this invention a small-diameter nozzle 13 of about ⅜-in. I. D. may be used in conjunction with a ¼-in. O. D. guide tube tip 12 which is positioned flush with the end of the nozzle. With such arrangement, a phenomenal improvement in the welding operation is achieved. The arc length is constant throughout the length of the weld; average arc current and arc voltage values are relatively constant; weld shielding is excellent; weld porosity is reduced or eliminated; and arcing in the guide tube tip is practically eliminated even with electrode wire of small diameter and constant potential. Many other process advantages have also been obtained with this invention including deeper weld penetration and lower transition currents on both reverse polarity-direct current and straight polarity-direct current.

Welds prepared in ⅝-in. thick type 1100 aluminum plate using a torch of the type disclosed in Scheller et al. Patent No. 2,754,395, modified according to the invention with 3/32-in. diameter aluminum wire at 300 amperes DCRP welding current, 24½ volt arc, 11 I. P. M. welding speed and with 50 C. F. H. argon flow, show that with the invention, weld surfaces are cleaner and there are no black deposits on the base metal.

Brief checks were made using wires other than aluminum, including steel, stainless steel, and Everdur. Shielding gas other than argon have also been tried, including: oxy-argon; helium; mixtures of argon and helium; and carbon dioxide. Both reverse and straight polarity welding currents were used and in every case a substantial improvement in arc stability and weld quality was obtained over that normally obtained with prior sigma welding.

The practical significances of the invention are manifold. Of prime interest is the stabilized arc. This coupled with deep penetration and excellent shielding allows the production of relatively long continuous welds without defects. For example, heretofore the welding of a five foot long seam in ⅛-in. aluminum for hot water tanks has not been completely satisfactory, because occasional severe arc fluctuations interrupted weld penetration and caused defects. This invention overcomes such problem. Furthermore, the greater penetration allows a reduction of and, in some cases, the elimination of back-chipping. While these advantages apply directly to sigma welding aluminum with constant-potential power, benefits have also been realized with other types of power, including A. C., and other metals.

By the term transition current as used above is meant that current level below which metal transfer is in the form of visible globules of molten metal and above which the transfer is in the form of a "spray" of small discrete droplets.

I claim:
1. Gas shielded arc working which comprises striking an arc between an electrode and a workpiece, shielding such arc with an annular stream of gas flowing at an exit velocity of at least 10 feet per second such that the arc is substantially constricted and stabilized thereby.

2. Gas shielded arc working as defined by claim 1, in which such electrode is consumable metal.

3. Gas shielded arc working as defined by claim 1, in which the gas is selected from class consisting of argon, oxy-argon, helium, argon-helium, and $CO_2$.

4. Method of electric arc welding with a bare wire consuming electrode connected to a source of welding current wherein an arc is struck between said electrode and a metal workpiece connected to said source and a gas is simultaneously fed to shield the arc, feeding the wire electrode toward the arc, and simultaneously supplying current from said source to the electrode and workpiece at a strength sufficient to both consume the wire electrode and also project molten metal axially from the wire electrode to the workpiece in the form of a "spray" of fine discrete droplets within the gas shield, characterized by feeding the gas in the direction of the electrode as an annular stream surrounding the electrode at a calculated exit velocity of the order of at least 10 feet per second whereby the arc is effectively shielded by an arc constricting annular curtain of gas which also stabilizes such arc.

5. Arc process which comprises striking a high pressure arc between work and an electrode, discharging an arc shielding gas from a nozzle having an annular orifice surrounding said electrode in spaced concentric relationship therewith, at an exit velocity of at least 10 feet per second to constrict such arc and thereby make it stable.

6. The method of arc producing sound and ductile welds free from porosity, which method comprises passing electric current through an electrode and a workpiece separated to form an arc, continuously flowing a stream of gas downwardly in an annular zone around the electrode and the arc, and maintaining a Reynolds number of more than 2,000 of such gas stream immediately upstream from the arc.

7. The method of arc producing sound and ductile welds free from porosity, which method comprises passing electric current through a weld depositing metal electrode and a workpiece separated to form an arc, and advancing the electrode toward the arc, the magnitude of the current and the rate of advance being sufficient to assure a substantial proportion of the electrode metal in the resultant weld metal, continuously flowing a stream of gas downwardly in an annular zone around the electrode and the arc and maintaining a Reynolds number of the stream above 3000 of such a gas stream immediately upstream from the arc.

8. Process of electric arc working as defined by claim 1, in which a sonic resonant condition is established which causes the arc to pulsate in unison therewith.

9. Apparatus for consumable electrode arc welding, which comprises an electrode, an electrode guide tube, a gas directing nozzle, said guide tube and said nozzle positioned so as to form a relatively small annular gas orifice, the end of said tube being substantially flush with the end of said nozzle, and means for feeding an arc shielding gas through said orifice at an exit velocity of at least 10 feet per second such that an arc energized between said electrode and the work being welded is constricted by such gas outside of the nozzle and thereby stabilized.

10. A whistling sigma torch comprising the combination of a rod contact-guide tube, a nozzle having a gas distribution chamber in communication with an annular arc-shielding gas exit orifice surrounding the end of said tube for discharging a selected arc-shielding gas at a calculated exit velocity of at least 10 feet per second, the end of said tube being substantially flush with the end of said nozzle, which combination is effective to constrict and thereby stabilize an arc drawn outside of such orifice between the end of a selected fusible metal rod that is fed through said tube toward such arc at a feed rate corresponding to the melting of the end of the rod by such arc to produce a "spray" type transfer of discrete droplets of metal toward a workpiece in circuit with said rod contact-guide tube.

References Cited in the file of this patent
UNITED STATES PATENTS

| | | |
|---|---|---|
| 1,716,614 | Bergman | June 11, 1929 |
| 1,746,196 | Langmuir et al. | Feb. 4, 1930 |
| 2,504,868 | Muller et al. | Apr. 18, 1950 |